US012749247B2

(12) United States Patent
Li et al.

(10) Patent No.: US 12,749,247 B2
(45) Date of Patent: Sep. 29, 2026

(54) AUTOMATIC AVATAR GENERATION USING SEMI-SUPERVISED MACHINE LEARNING

(71) Applicant: ADOBE INC., San Jose, CA (US)

(72) Inventors: Yijun Li, Seattle, WA (US); Yannick Hold-Geoffroy, Québec (CA); Manuel Rodriguez Ladron De Guevara, Pittsburgh, PA (US); Jose Ignacio Echevarria Vallespi, Brooklyn, NY (US); Daichi Ito, San Jose, CA (US); Cameron Younger Smith, Santa Cruz, CA (US)

(73) Assignee: Adobe Inc., San Jose, CA (US)

( * ) Notice: Subject to any disclaimer, the term of this patent is extended or adjusted under 35 U.S.C. 154(b) by 460 days.

(21) Appl. No.: 18/176,267

(22) Filed: Feb. 28, 2023

(65) Prior Publication Data

US 2024/0290022 A1 Aug. 29, 2024

(51) Int. Cl.

*G06T 13/40* (2011.01)
*G06N 3/0455* (2023.01)
*G06N 3/0895* (2023.01)

(52) U.S. Cl.

CPC ........... *G06T 13/40* (2013.01); *G06N 3/0455* (2023.01); *G06N 3/0895* (2023.01)

(58) Field of Classification Search

None

See application file for complete search history.

(56) References Cited

U.S. PATENT DOCUMENTS 12,406,422 B2 * 9/2025 Nagano .................. G06T 13/40
2019/0340419 A1 * 11/2019 Milman ................. G06N 20/00
2023/0130535 A1 * 4/2023 Ma .......................... G06T 13/40 345/474

(Continued)

OTHER PUBLICATIONS

Y. Shi et al., "WarpGAN: Automatic Caricature Generation", In Proceedings of the IEEE/CVF Conference on Computer Vision and Pattern Recognition, pp. 10762-10771. 2019 (15 pages).

(Continued)

*Primary Examiner* — Jeffrey J Chow

(74) *Attorney, Agent, or Firm* — Shook, Hardy & Bacon L.L.P.

(57) ABSTRACT

Avatar generation from an image is performed using semi-supervised machine learning. An image space model undergoes unsupervised training from images to generate latent image vectors responsive to image inputs. An avatar parameter space model undergoes unsupervised training from avatar parameter values for avatar parameters to generate latent avatar parameter vectors responsive to avatar parameter value inputs. A cross-modal mapping model undergoes supervised training on image-avatar parameter pair inputs corresponding to the latent image vectors and the latent avatar parameter vectors. The trained image space model generates a latent image vector from an image input. The trained cross-modal mapping model translates the latent image vector to a latent avatar parameter vector. The trained avatar parameter space model generates avatar parameter values from the latent avatar parameter vector. The latent avatar parameter vector can be used to render an avatar having features corresponding to the input image.

20 Claims, 10 Drawing Sheets

(56) References Cited

U.S. PATENT DOCUMENTS

| | | | | |
|---|---|---|---|---|
| 2023/0245351 | A1* | 8/2023 | Cao | G06T 11/00 345/629 |
| 2024/0046536 | A1* | 2/2024 | Prasad | G06T 11/40 |
| 2024/0135621 | A1* | 4/2024 | Sang | G06V 10/82 |
| 2024/0282117 | A1* | 8/2024 | Shrivastava | B60W 60/001 |
| 2025/0363681 | A1* | 11/2025 | Wang | G06T 11/10 |

OTHER PUBLICATIONS

J. Gong et al., "AutoToon: Automatic Geometric Warping for Face Cartoon Generation", In Proceedings of the IEEE/CVF Winter Conference on Applications of Computer Vision, pp. 360-369. 2020 (10 pages).

W. Jang et al., "StyleCariGAN: Caricature Generation via StyleGAN Feature Map Modulation", ACM Transactions on Graphics (TOG) 40, No. 4 (2021): 1-16 (16 pages).

K. Cao et al., "CariGANs: Unpaired Photo-to-Caricature Translation.", arXiv preprint arXiv:1811.00222 (2018) (14 pages).

T. Shi et al., "Face-to-Parameter Translation for Game Character Auto-Creation", In Proceedings of the IEEE/CVF International Conference on Computer Vision, pp. 161-170. 2019 (16 pages).

T. Shi et al., "Fast and Robust Face-to-Parameter Translation for Game Character Auto-Creation", In Proceedings of the AAAI Conference on Artificial Intelligence, vol. 34, No. 02, Apr. 2020, pp. 1733-1740 (12 pages).

L. Wolf et al., "Unsupervised Creation of Parameterized Avatars", In Proceedings of the IEEE International Conference on Computer Vision, pp. 1530-1538. 2017 (13 pages).

K. Simonyan et al., "Very Deep Convolutional Networks For Large-Scale Image Recognition", available at https://doi.org/10.48550/arXiv.1409.1556 (14 pages).

NVLabs FFHQ (Flickr-Faces-HQ), which is available at https://github.com/NVlabs/ffhq-dataset (8 pages).

* cited by examiner

AUTOMATIC AVATAR GENERATION USING SEMI-SUPERVISED MACHINE LEARNING

BACKGROUND

An avatar is a digital character. Some avatars are generated to have features similar to a person.

SUMMARY

At a high level, aspects of the technology describe machine learning methods for automatically generating avatars. The machine learning methods are semi-supervised in that they comprise aspects of supervised and unsupervised training methods that together create a model that generates an avatar from an input image, such as a person's face.

The training includes training an image space model on a set of images. Based on the training, the trained image space model generates latent image vectors responsive to image inputs. An avatar parameter space model is trained on a set of avatar parameter values for avatar parameters. The trained avatar parameter space model generates latent avatar parameter vectors responsive to avatar parameter value inputs. Each of the image space model and the avatar parameter space model are trained using an unsupervised training method.

A cross-modal mapping model is also trained. The cross-modal mapping model is trained on the latent image vectors and the latent avatar parameter vectors of image-avatar parameter pairs. Based on the training, the trained cross-modal mapping model is configured to translate a latent image vector from a latent image vector space to a latent avatar parameter vector of a latent avatar parameter vector space. The cross-modal mapping model is trained using a supervised training method.

At runtime, a latent image vector encoder of the trained image space model receives an image input and generates a latent image vector. The latent image vector is translated to a latent avatar parameter vector by the trained cross-modal mapping model. A latent avatar parameter vector decoder receives the latent avatar parameter vector as an input and generates avatar parameter values that can be used to render an avatar having features corresponding to features of the image input.

In one example use case, the trained model is used to generate an avatar of a human face responsive to receiving an image input comprising the human face. In this case, the avatar has animated facial features corresponding to the facial features of the human face in the image input.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
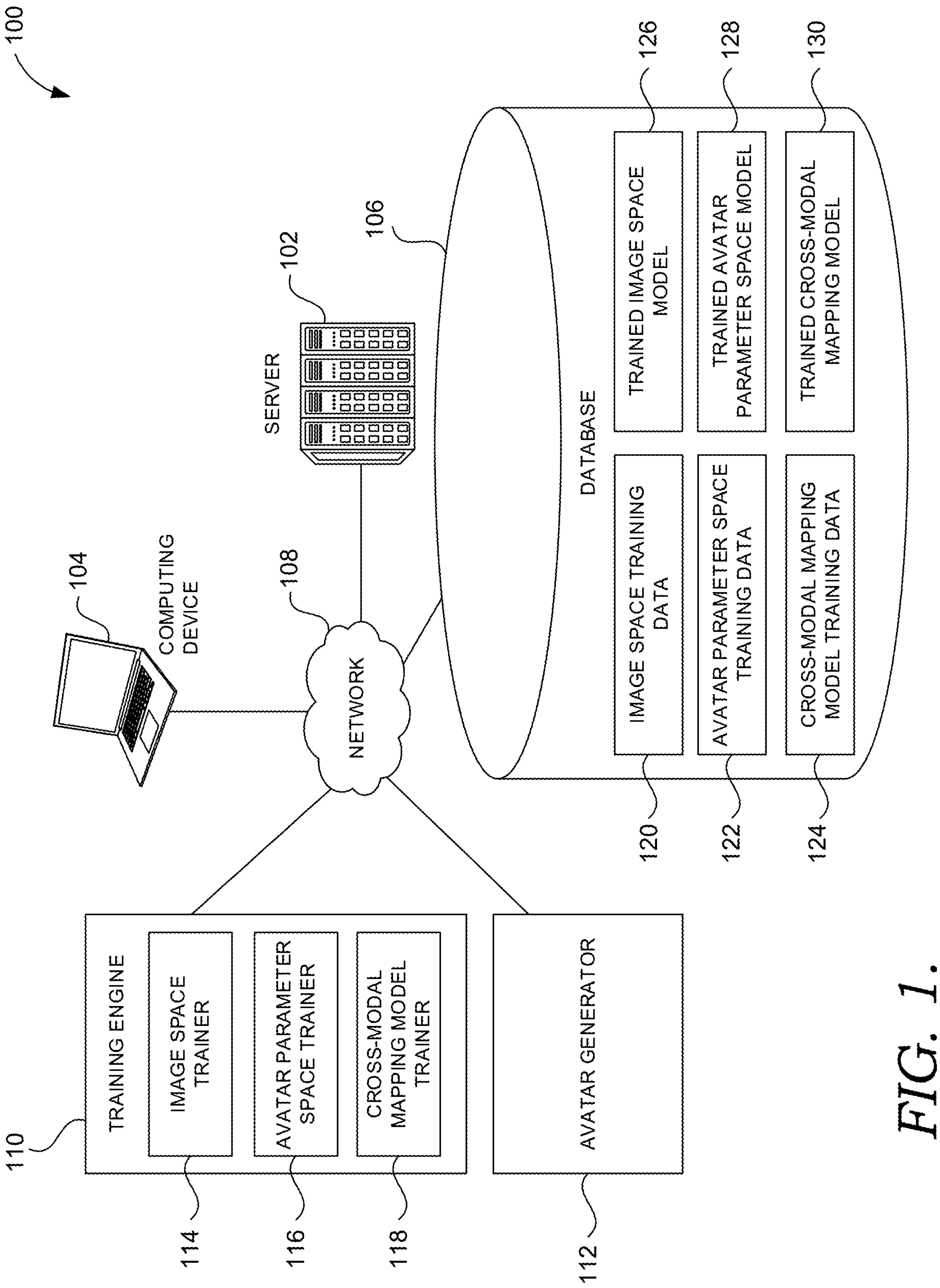
FIG. 1 illustrates an example operating environment in which aspects of the technology may be employed, in accordance with an embodiment described herein.

In general, the technology describes automatically converting images, such as a facial photograph, into a vectorized avatar, from which an animated image of the avatar can be rendered. Automating avatar generation from images is a complex problem, and no similar existing automatic avatar customization system has been identified among conventional methods. Rather, many of the conventional methods are done by manually selecting facial components from a big library of preset images.

There have been different approaches to this problem, but they can be broadly categorized into manual selection and neural methods. Manual selection methods are currently the default option that is implemented in many different systems: video games, social networks, chats, metaverse, etc. Any app or game has a rather large library of facial components in which the user selects from to form their avatar. The main drawbacks of this method are time inefficiency and limitation in visual resemblance to the user's face. Within neural methods, one approach is to see this problem as image-to-image translation and directly generate avatars in the image space. While this generally can work, having avatars in the image space is limiting for applications or products since the resolution of the avatar depends on the resolution of the training model.

Prior work related to using neural networks for avatar generation generally uses adversarial approaches or pre-trained differentiable renderers to predict the avatar parameters. Before training the predicting network, it is usually necessary to train a neural differentiable renderer that takes in the vector of parameters that conform the avatar and outputs its corresponding avatar image in the image space. Once this engine is trained, it is used in the main training procedure to render the parameters. There is also normally a discriminator network whose job is to discern between real and fake pairs of face-avatars. In some cases, there is a face segmentation network to help the training process.

These conventional systems are susceptible to overfitting problems due to the limited number of avatar-image training pairs. This type of training data is time consuming and challenging to produce, and even more difficult in the quantity needed to train some of the conventional networks for avatar generation in the image space. However, without significant training data, conventional machine learning models will likely overfit the training data and produce limited quality results.

The technology described herein provides a framework that improves upon the common instability issues of adversarial models. In contrast to some of the conventional methods, the models provided by this disclosure often avoid instability problems common in adversarial approaches. The described models leverage paired and unpaired data to increase the capacity and overcome the issue of having a limiting number of image-avatar pairs generated by an artist. By doing so, the models can use some unpaired data during training, allowing training on large, already-available image datasets. Further, the described models leverage multimodal complementary information that helps training by regularizing the network (also viewed as alignment loss). Have trained parts of the model on the large datasets using unsupervised methods, a portion of the model can then be trained on the limited number of paired data as a supervised training process. The resulting trained models produce avatar parameters that can be rendered into animated avatars with better quality than existing methods, while having been trained on the limited pair data. In this way, the methods and models described herein outperform many of the conventional methods when trained on a limited number of paired data.

One example method that achieves some of these benefits and solves some of these problems uses a semi-supervised training approach. This approach takes advantage of training on available image sets, yet also trains on a relatively smaller avatar-image set, to yield improved results in automatic avatar generation.

Initially, an image space model for the image space and an avatar parameter space model for the avatar parameter space are trained. The image space model comprises a latent image vector encoder that learns to output a latent image vector in response to an image input. The image space model is trained using a database of images, such as faces.

The avatar parameter space model comprises a latent avatar parameter vector encoder and a latent avatar parameter vector decoder. The avatar parameter space model is trained using a dataset of avatar parameter values and learns to output a latent avatar parameter vector in response to an input comprising a set of avatar parameter values. Unsupervised training methods are used to train the image space model and the avatar parameter space model.

Using the latent image vector encoder of the trained image space model and the latent avatar parameter vector encoder of the trained avatar parameter space model, a cross-modal mapping model is trained. A latent parameter vector decoder may also be trained and used to train the cross-modal mapping model. The cross-modal mapping model is trained using supervised learning on a set of image-avatar parameter pairs. The image-avatar parameter pairs are used as image-avatar parameter pair inputs to the latent image vector encoder and the latent avatar parameter vector encoder. The respective output latent image vectors and the output latent avatar parameter vectors corresponding to the image-avatar parameter pairs are used to train the cross-modal mapping model.

Having trained the image space model, the avatar parameter space model, and the cross-modal mapping model, the trained models can be employed to automatically generate an avatar from an image, such as an image of a face or body. Specifically, the latent image vector encoder from the trained image space model, the trained cross-modal mapping model, and the latent avatar parameter vector decoder can be used to generate avatar parameters for the image that can be rendered into an avatar that is animated with features corresponding to the original input image.

Using the model, the latent image vector encoder receives an image input and generates a latent image vector. The latent image vector is input to the trained cross-modal mapping model, which outputs a latent avatar parameter vector. The latent avatar parameter vector is input to the latent avatar parameter vector decoder, which outputs the avatar parameters for the image. The avatar parameters can be rendered to generate the avatar.

It will be realized that the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided for automatically generating an avatar from an image. Among other components or engines not shown, operating environment 100 comprises server 102, computing device 104, and database 106, which are communicating via network 108. Server 102 and computing device 104 implement functional aspects of training engine 110 and avatar generator 112, as will be described, to facilitate automatic avatar generation.

To generate avatars from images, the various machine learning models may be trained. Training engine 110 generally facilitates training of one or more of the models used for avatar generation. In the example illustrated, training engine 110 comprises image space trainer 114, avatar parameter space trainer 116, and cross-modal mapping model trainer 118. As will be further described, each of these respectively trains an image space model, an avatar parameter space model, and a cross-modal mapping model. The trained models may be stored in database 106.

Figure 2:
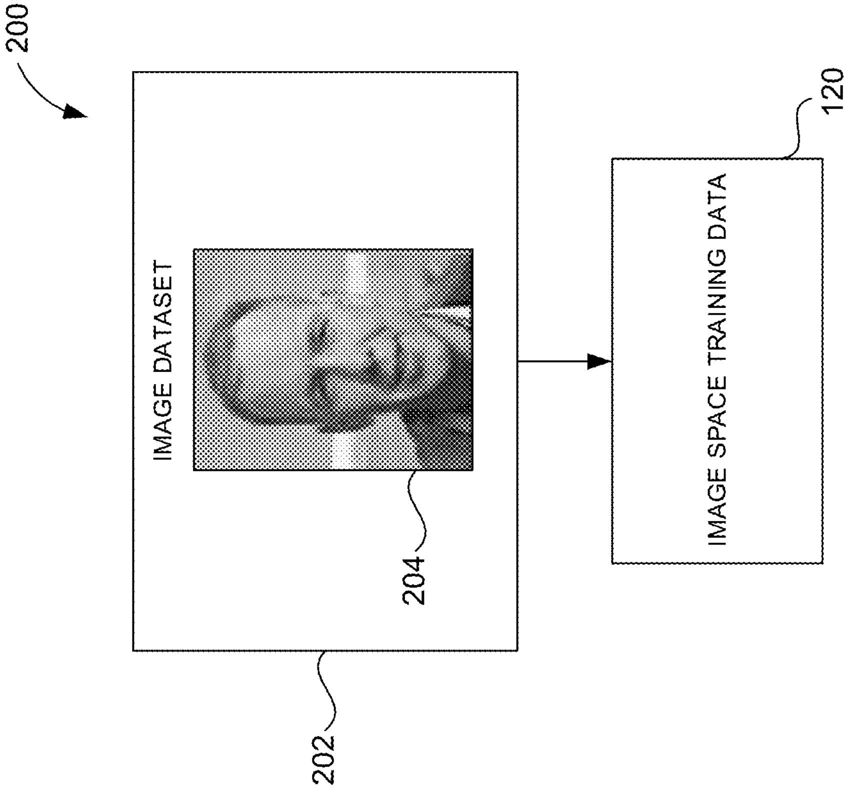
FIG. 2 illustrates an example process for obtaining image space training data, in accordance with an embodiment described herein.
Figure 3:
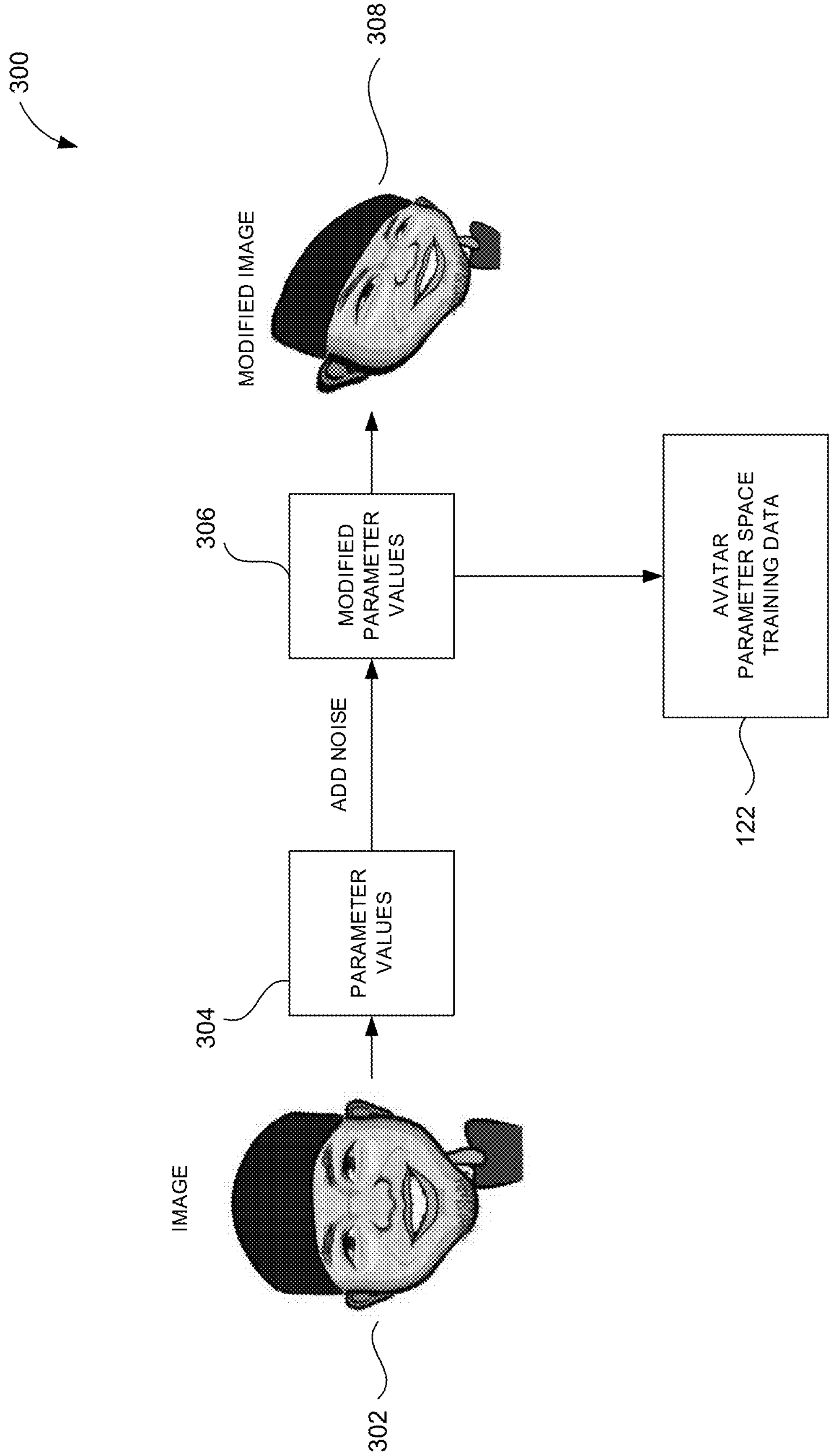
FIG. 3 illustrates an example process for obtaining avatar parameter space training data, in accordance with an embodiment described herein.
Figure 4:
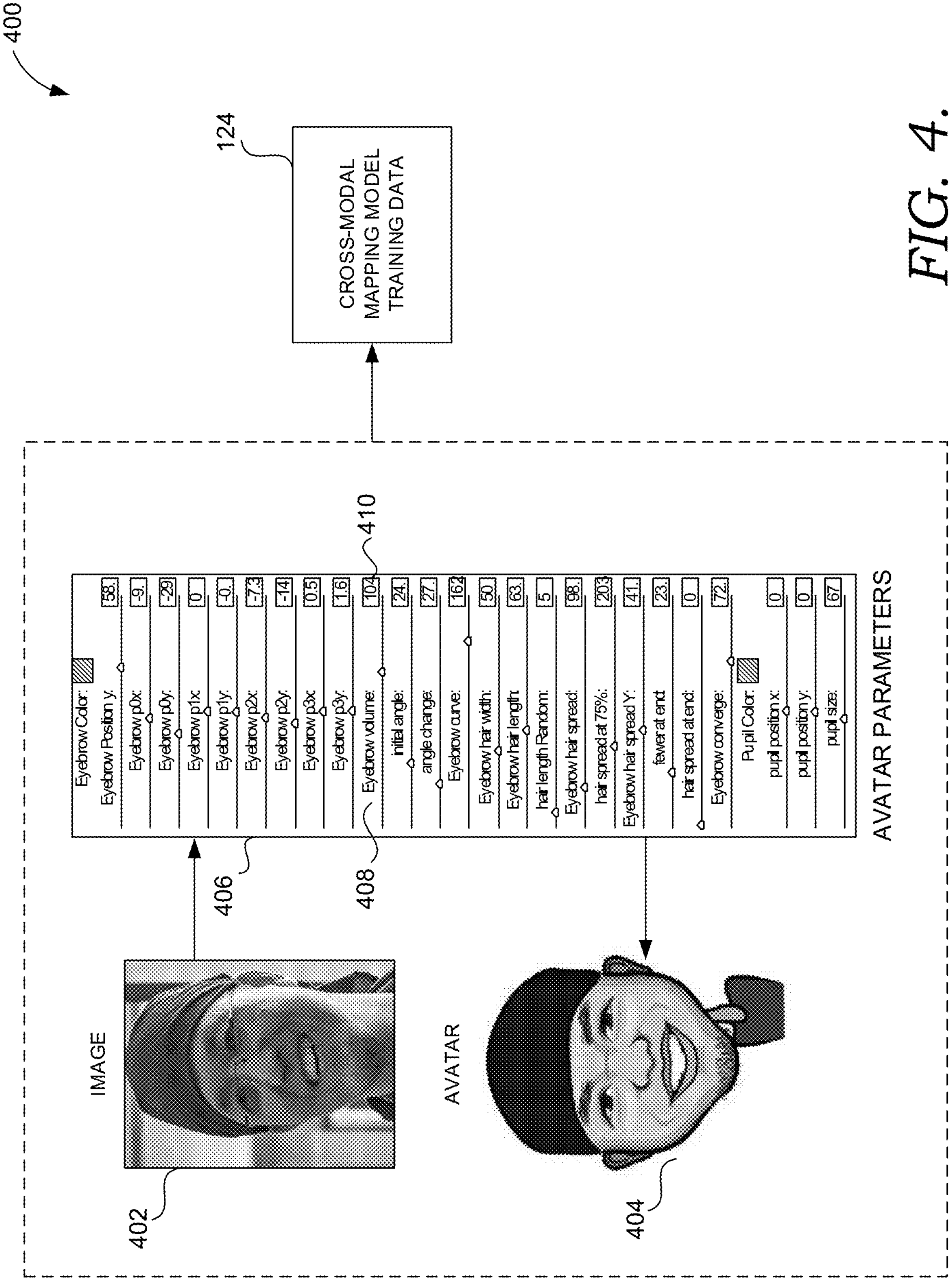
FIG. 4 illustrates an example process for obtaining cross-modal mapping model training data, in accordance with an embodiment described herein.
Figure 5:
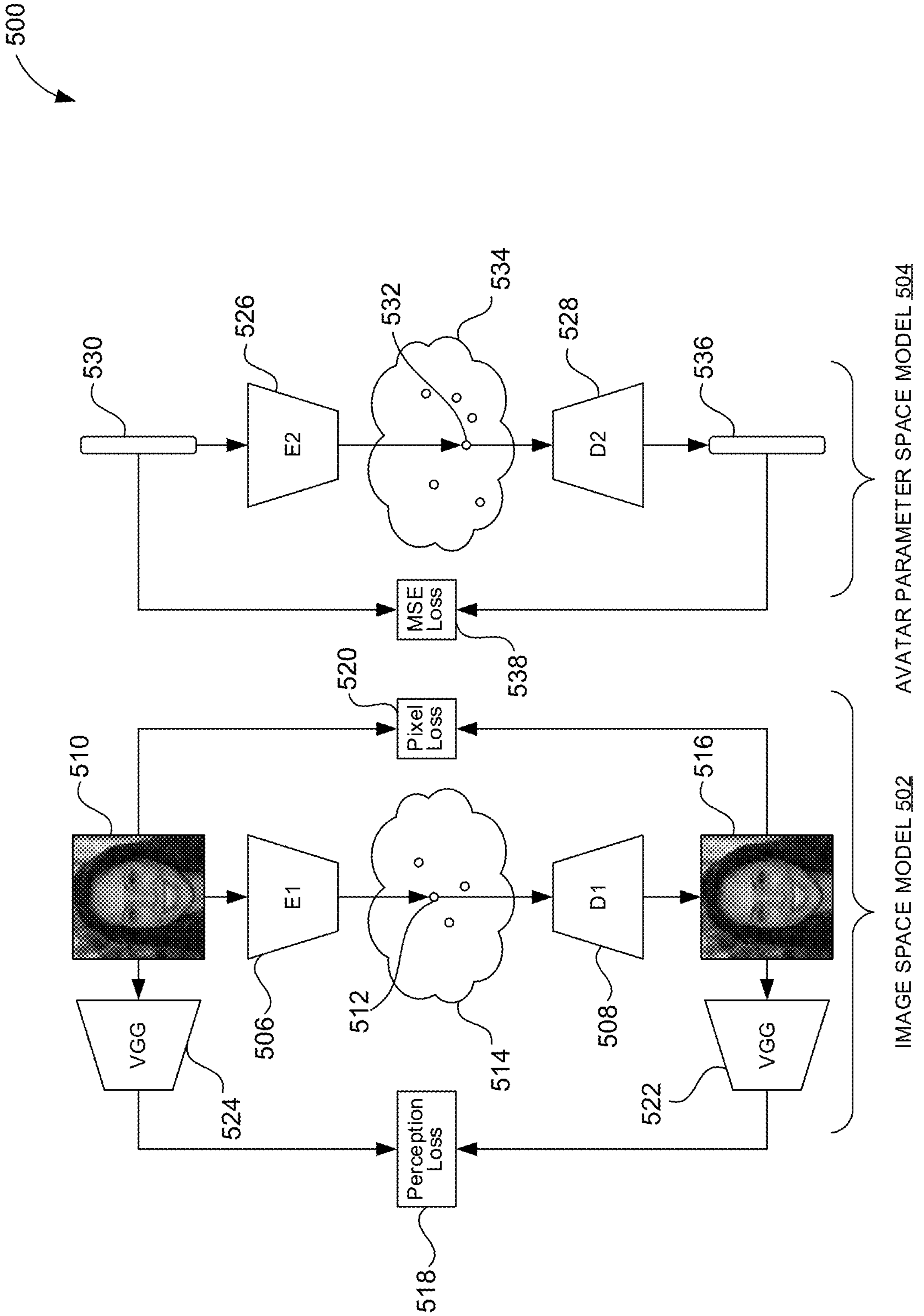
FIG. 5 illustrates an example training process for training an image space model and an avatar parameter space model, in accordance with an embodiment described herein.
Figure 6:
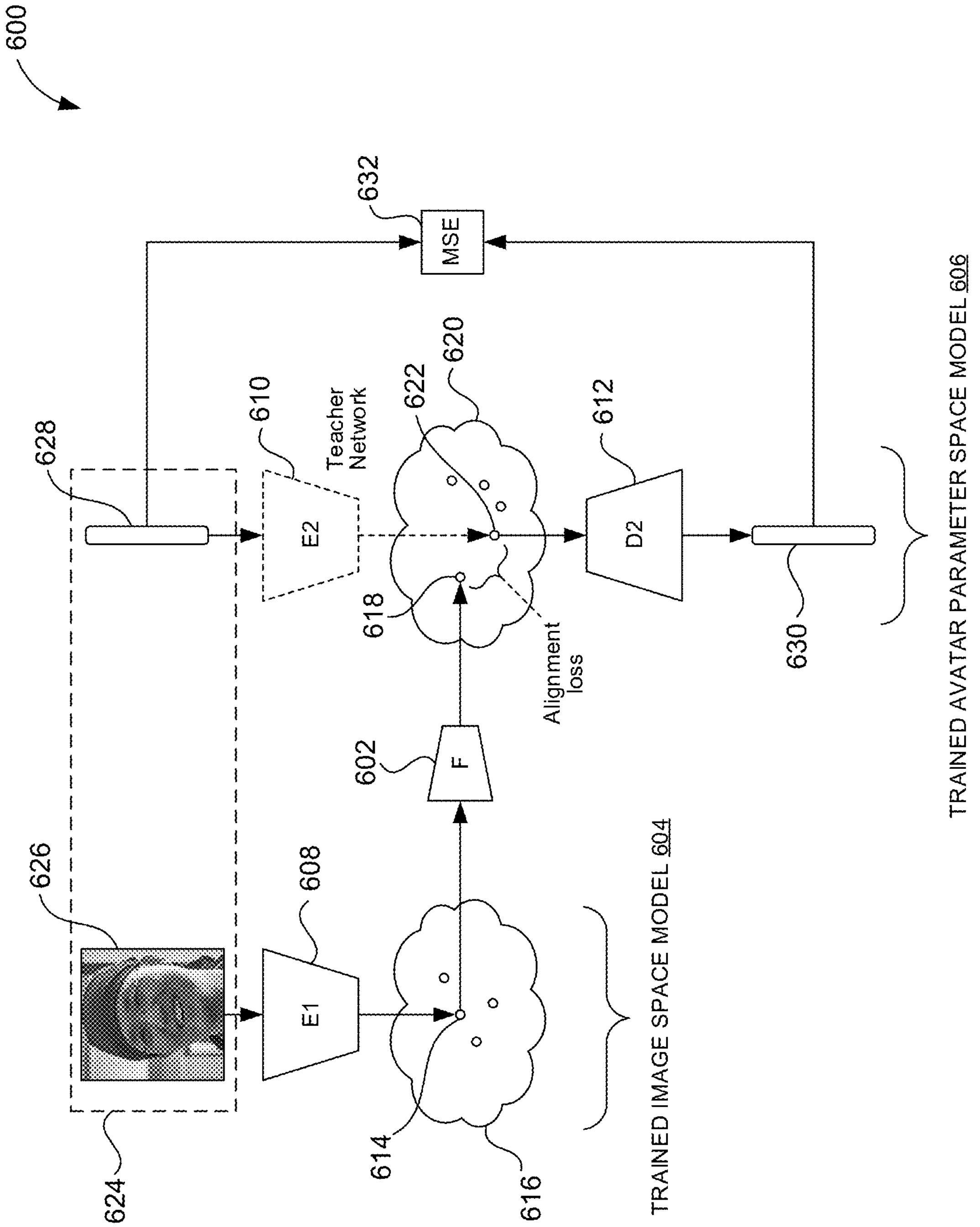
FIG. 6 illustrates an example training process for training a cross-modal mapping model, in accordance with an embodiment described herein.

Each of the models is trained on a dataset. FIGS. 2-4 illustrate methods of obtaining the datasets used for training the models. These datasets may be stored in database 106, illustrated here as image space training data 120, avatar parameter space training data 122, and cross-modal mapping model training data 124. These are respectively utilized by image space trainer 114, avatar parameter space trainer 116, and cross-modal mapping model trainer 118 for training the various models. Example aspects of this training are illustrated in FIGS. 5-6. Training of the models generates trained image space model 126, trained avatar parameter space model 128, and trained cross-modal mapping model 130.

Data generating process 200, illustrated in FIG. 2, depicts an example process of obtaining image space training data 120, which will be used to train the image space model. Image space training data 120 generally comprises images from image dataset 202. In an aspect of the technology, the images can be facial images, such as image 204. One suitable dataset that can be accessed and used as image space training data 120 is the NVLabs FFHQ (Flickr-Faces-HQ), which is available at https://github.com/NVlabs/ffhq-dataset. At the time of filing, the dataset included 70,000 high-quality PNG images at 1024×1024 resolution. The dataset includes variation in terms of age, ethnicity and image background. It also has good coverage of accessories such as eyeglasses, sunglasses, hats, and so forth. The FFHQ dataset or another like dataset, including those comprising other image types, may be used for the training. While image space training data 120 is illustrated as being obtained in part or in whole from image dataset 202 and stored at database 106, it will be understood that image space training data 120 may be stored remotely at another server accessible to server 102 and accessed for training the image space model. Further, it is again noted that, while the example being described uses faces and generates an animated avatar of a face, the methods described herein are suitable for other image types. Some non-limiting examples include: all or portions of a human body, animal images, landscape images, artwork, nature images, abstract images, and so forth. Nothing in the description is intended to limit the technology to a particular image type.

Data generating process 300 of FIG. 3 illustrates an example process of obtaining avatar parameter space training data 122, which will be used to train the avatar parameter space model. In this example, parameter values 304 are avatar parameter values for avatar parameters that correspond to image 302. That is, in general, avatar parameters are features of an avatar that may be adjusted, as will be further described. Each parameter describes a part of a visual depiction of the avatar. The avatar parameter value for the avatar parameter defines how that part of the visual depiction corresponding to the avatar parameter looks. Thus, in this example, the collective avatar parameter values 304, when rendered, generate image 302. In an example reduced to practices, a facial avatar is defined by 629 avatar parameters, each having a value range that changes the visual effect of a part of the avatar.

Avatar parameter space training data 122 can be generated by adding noise to one or more parameter values of the avatar parameter values, such as parameter values 304. Adding noise may include modifying one or more of the parameter values 304 to generate modified parameter values 306. As will be understood, modified parameter values 306 would render a visually different avatar, such as that illustrated by modified image 308. In an aspect of the technology, the modified parameter values that are generated and stored as part of avatar parameter space training data 122 may not render a recognizable face or other desired digital image. This generally will not pose a problem during training since the avatar parameter space model is being trained to reproduce the modified parameter values, as opposed to training on the image itself. In an aspect, data generating process 300 can be used to generate 10,000 sets of avatar parameter values for the avatar parameters, which can be stored as avatar parameter space training data 122 for use in training the avatar parameter space model. As noted, the images in FIG. 3 are provided as example aids in describing the technology. In aspects, generating modified parameter values 306 for use as avatar parameter space training data 122 may comprise randomly modifying avatar parameter values to generate the number of sets of avatar parameters that will be used for training. In an aspect, this is done without rendering images or using images to correspond to the generated avatar parameter values.

Data generating process 400 of FIG. 4 illustrates an example process for obtaining cross-modal mapping model training data 124, which will be used to train the cross-modal mapping model. Cross-modal mapping model training data 124 generally comprises image-avatar parameter pairs from which an avatar can be generated to have features similar to the image. In other terms, the image-avatar parameter pairs are labeled data that can be used with supervised training methods. That is, an image will have corresponding avatar parameter values that are used to generate an avatar with features corresponding to the image.

To obtain the image-avatar parameter pairs for cross-modal mapping model training data 124, avatar parameter values can be input (for example, by manually adjusting the parameter values) so that corresponding avatar parameters render an avatar having features corresponding to those of the image. Referring to FIG. 4 as an example, avatar parameters 406 generally describe features of avatar 404 that can be adjusted. As noted, in an embodiment reduced to practice, 629 avatar parameters are used to describe features of an avatar, such as avatar 404. The features of avatar 404 may be modified by changing parameter values, such as avatar parameter value 410 of avatar parameter 408. In an embodiment, each avatar parameter comprises a range of avatar parameter values that each adjusts a feature of the avatar over a range of adjustment. To provide an example, the range could from −100 to 100, where each value represents a relative change to the feature being adjusted. By adjusting the avatar parameter values, the resulting avatar can be made to have features that are visually similar to an image. As illustrated, the avatar parameter values for avatar parameters 406 have been adjusted so that avatar 404 resembles image 402. In this way, avatar parameters 406 can be used to render avatar 404.

Using still the example of FIG. 4, the avatar parameter values are adjusted to generate avatar 404. When avatar 404 visually resembles image 402, the resulting avatar parameter values are associate with image 402, thus providing an image-avatar parameter pair. Generated image-avatar parameter pairs are then stored as part of cross-modal mapping model training data 124.

As previously noted, training engine 110 of FIG. 1 can be employed to access the collected training data, such as image space training data 120, avatar parameter space training data 122, and cross-modal mapping model training data 124, to train models that will be used to generate an avatar from an input image. For instance, image space trainer 114 generally trains an image space model using image space training data 120 to generate trained image space model 126. Avatar parameter space trainer 116 generally trains an avatar parameter space model using avatar parameter space training data 122 to generate trained avatar parameter space model 128. All or a portion of the models of trained image space model 126 and trained avatar parameter space model 128 may be used by cross-modal mapping model trainer 118 to train a cross-modal mapping model to generate trained cross-modal mapping model 130. Subsequently, trained image space model 126, trained avatar parameter space model 128, and trained cross-modal mapping model 130, e.g., components thereof, may be used to automatically generate avatar parameters that render an avatar from an image.

FIG. 5 depicts an example training process 500 that illustrates the training of image space model 502 and avatar parameter space model 504 so that the resulting trained models may be used to generate avatars by avatar generator 112, which generally employs the trained models during avatar generation. In aspects, image space trainer 114 may be used to train image space model 502, while avatar parameter space trainer 116 can be used to train avatar parameter space model 504. All or a portion of image space model 502 or avatar parameter space model 504, once trained, may be stored as trained image space model 126 or trained avatar parameter space model 128, respectively.

In the illustrated example, image space model 502 comprises a latent image vector autoencoder. Image space model 502 may comprise a neural network. As this example is an autoencoder, during training, image space model 502 comprises latent image vector encoder 506 and latent image vector decoder 508. A convolutional neural network (CNN) is a suitable neural network for the image space, as it may be used as part of image space model 502, such as latent image vector encoder 506.

Image space model 502 may be trained on image space training data 120. During training, latent image vector encoder 506 receives image input 510. Image input 510 may be retrieved from image space training data 120. In response, latent image vector encoder 506 outputs latent image vector 512 in latent image vector space 514. Latent image vector 512 is provided as an input to latent image vector decoder 508, which generates decoded image 516 in response.

The loss between image input 510 and decoded image 516 is measured. The weights of latent image vector encoder 506 and latent image vector decoder 508 are optimized during training to minimize this loss. As an example, perception loss 518 or pixel loss 520 can be measured during each iteration of the training.

Perception loss 518 generally uses a pre-trained classifier to identify and determine the loss between high-level features of image input 510 and decoded image 516. To do so, another neural network may be employed to increase model performance of a CNN, when the CNN is used as latent image vector encoder 506. One example of such model is VGG (Visual Geometry Group), sometimes referred to as VGGNet. An example of this network is described in Karen Simonyan & Andrew Zisserman's "Very Deep Convolutional Networks for Large-Scale Image Recognition," available at https://doi.org/10.48550/arXiv.1409.1556, which is hereby expressly incorporated by reference in its entirety. The VGG may be employed as VGG 522 and VGG 524 to measure perception loss 518.

Pixel loss 520 may be measured and minimized during training. In general, pixel loss 520 measures the pixel difference between image input 510 and decoded image 516 in a per-pixel level. For instance, a pixel loss function can be used to find the error between each pixel, and the total error is determined to measure the pixel loss 520. Some example loss functions for measuring the error between each pixel to determine the total pixel error include mean square error, absolute error, smooth absolute error, and the like.

During training, the weights of at least latent image vector encoder 506 are optimized to minimize the loss, as measured by perception loss 518 or pixel loss 520. The weights of latent image vector decoder 508 may also be optimized using perception loss 518 or pixel loss 520. The resulting trained image space model having the optimized weights is stored as trained image space model 126, illustrated in FIG. 1. In an aspect, at least latent image vector encoder 506 is stored as trained image space model 126. As will be described, latent image vector encoder 506, as trained image space model 126, may be used by other components of FIG. 1, such as cross-modal mapping model trainer 118 and avatar generator 112.

Turning back to FIG. 5, the figure further depicts the training of avatar parameter space model 504. Avatar parameter space model 504 may be trained by avatar parameter space trainer 116 using avatar parameter space training data 122. In the illustrated example, avatar parameter space model 504 comprises a latent avatar parameter vector autoencoder. The latent avatar parameter vector autoencoder may comprise one or more multilayer perceptrons (MLPs). In an aspect, latent avatar parameter vector encoder 526 and latent avatar parameter vector decoder 528 are each MLPs.

As illustrated, avatar parameter space model 504 comprises latent avatar parameter vector encoder 526 and latent avatar parameter vector decoder 528. During training, latent avatar parameter vector encoder 526 receives avatar parameter value input 530. Avatar parameter value input 530 may be retrieved from avatar parameter space training data 122 and comprises avatar parameter values. In response, latent avatar parameter vector encoder 526 generates latent avatar parameter vector 532 within latent avatar parameter vector space 534. Latent avatar parameter vector 532 can then be decoded by latent avatar parameter vector decoder 528 to generate decoded avatar parameter value 536.

The loss between avatar parameter value input 530 and decoded avatar parameter value 536 is minimized by optimizing the weights of latent avatar parameter vector encoder 526 and latent avatar parameter vector decoder 528. In FIG. 5, the minimized loss is loss 538, illustrated as "MSE loss," or "mean square error loss." However, it will be realized that other loss functions may be used, such as cosine similarity, mean absolute error, mean bias error, and so forth.

Having trained avatar parameter space model 504, all or a portion of the trained model may be stored as trained avatar parameter space model 128. In an aspect, at least latent avatar parameter vector encoder 526 and latent avatar parameter vector decoder 528, having weights optimized through training, are stored as trained avatar parameter space model 128 for use by other components of FIG. 1, such as cross-modal mapping model trainer 118. As previously noted, the training of image space model 502 and avatar parameter space model 504 is said to be unsupervised. What is meant here by unsupervised is that at least a portion of image space training data 120 and avatar parameter space training data 122 is unlabeled with respect to image-avatar parameter pairs. That is, at least some of the training images within image space training data 120 may not have avatar parameters or avatars associated therewith, and at least some of the avatar parameters included in avatar parameter space training data 122 may not have images associated therewith.

As noted, cross-modal mapping model trainer 118 may employ aspects of trained image space model 126 and trained avatar parameter space model 128 to train a cross-modal mapping model that is used to facilitate avatar generation. In general, a trained cross-modal mapping model translates a latent image vector to a latent avatar parameter vector, which is decoded from the latent avatar parameter vector space to generate avatar parameters that can be used to generate an avatar having features corresponding to those of an input image associated with the latent image vector.

FIG. 6 illustrates training process 600 that is used to train a cross-modal mapping model, such as cross-modal mapping model 602. Cross-modal mapping model trainer 118 can be used to train cross-modal mapping model 602 using cross-modal mapping model training data 124. As noted, since cross-modal mapping model training data 124 comprises labeled pairs, the training of cross-modal mapping model 602 is said to be a form of supervised learning. Cross-modal mapping model 602 may be a neural network. In an aspect suitable for use, cross-modal mapping model 602 is an MLP. What is meant here by supervised learning is that at least some of cross-modal mapping model training data 124 used for training comprises labeled data with respect to an image-avatar parameter pair, such as image-avatar parameter pair input 624.

Continuing with FIG. 6, trained image space model 604 and trained avatar parameter space model 606 are used to train cross-modal mapping model 602. For instance, latent image vector encoder 608 may be the result of training latent image vector encoder 506 in FIG. 5. Similarly, latent avatar parameter vector encoder 610 may be the result of training latent avatar parameter vector encoder 526 in FIG. 5. Each of latent image vector encoder 608 and latent avatar parameter vector encoder 610 may be included as trained image space model 126 and trained avatar parameter space model 128, respectively. In some aspects, latent avatar parameter vector decoder 612 is the result of training latent avatar parameter vector decoder 528 in FIG. 5 and is used to generate decoded avatar parameter value 630. Latent avatar parameter vector decoder 612 may also be included in trained avatar parameter space model, and in some aspects is also employed during training of cross-modal mapping model 602.

During training, image-avatar parameter pair input 624 is accessed from cross-modal mapping model training data 124. Image-avatar parameter pair input 624 comprises image input 626 and avatar parameter value input 628, which are pairs as previously described in the discussion of FIG. 4.

Image input 626 is input to latent image vector encoder 608 that, in response, generates latent image vector 614 within latent image vector space 616. Latent image vector 614 is provided as an input to cross-modal mapping model 602 which generates cross-modal mapping model output vector 618 within latent avatar parameter vector space 620 in response.

Cross-modal mapping model 602 learns to translate from latent image vector space 616 to latent avatar parameter vector space 620. As such, latent avatar parameter vector encoder 610 can be provided as a teacher network to accomplish this. Here, avatar parameter value input 628 of image-avatar parameter pair input 624 is provided as an input to latent avatar parameter vector encoder 610. In response, latent avatar parameter vector encoder 610 generates latent avatar parameter vector 622.

The difference between cross-modal mapping model output vector 618 and latent avatar parameter vector 622 in latent avatar parameter vector space 620 is the alignment loss. Cross-modal mapping model 602 is trained by minimizing the alignment loss. That is, the weights of cross-modal mapping model 602 are optimized during training to minimize this alignment loss, thereby teaching cross-modal mapping model 602 to translate from latent image vector space 616 to latent avatar parameter vector space 620. Some example loss functions include mean square error, cosine similarity, mean absolute error, weight similarity loss, mean bias error, and the like. On minimizing the alignment loss, cross-modal mapping model 602 is thus trained to translate from latent image vector space 616 to latent avatar parameter vector space 620, which will be used at runtime to generate an avatar from an image, as will be further described with respect to FIG. 7. In implementation employing latent avatar parameter vector decoder during the training of cross-modal mapping model 602, the loss between avatar parameter value input 628 and decoded avatar parameter value 630 is also measured and minimized. This can be doing using any of the loss functions described herein, such as MSE 632, which is illustrated as an example. Some other examples include cosine similarity, mean absolute error, mean bias error, and so forth.

As a further example, after learning the latent spaces during training of image space model 502 and avatar parameter space model 504, the goal is to find a mapping between them, i.e., the training of cross-modal mapping model 602, designated as F. The cross-modal network is then: S→T, where S is the latent image vector space 616 and Tis the latent avatar parameter vector space 620. This as an input latent image vector 614, designated as $z_S = E_s(\mathcal{X})$ and outputs a cross-modal mapping output 618, designated as $z_m = F(E_s(\mathcal{X}))$ in the latent avatar parameter vectors space, where S, T$\in \mathbb{R}^u$. In this case, F is can be modeled as a multilayer perceptron with one hidden layer and non-linearity activation functions. F is trained on a weakly paired dataset in the form $$\{\mathcal{X}_i, \bar{\mathcal{Y}}_i\}_{i=1}^N,$$

where $\mathcal{X}_i, \bar{\mathcal{Y}}_i$ is the i-th tuple of paired image and parameter vectors, respectively. The weights of latent image vector encoder 608, designated as $E_s$ and latent avatar parameter vector decoder, designated as $D_t$ are fixed to perform a forward pass through these networks. Here, a reconstruction loss $\mathcal{L}_{rec} = (\hat{\mathcal{Y}} - \bar{\mathcal{Y}})^2$, where $\hat{\mathcal{Y}} = D_t(F(E_s(\mathcal{X})))$ can be used. While training, F is learning an intermediate latent space M that wants to be as close to T as possible. This translation, however, uses further regularization terms to enforce a closer alignment between such latent spaces.

To enforce an explicit alignment between the new translated space M and the vector parameter latent space T, encoder $E_t$ can be used to extract the learned latent representation $z_t = E_t(\bar{\mathcal{Y}})$ of the input parameter vector $\bar{\mathcal{Y}}$, and align the translated vector $z_f$ to $z_t$. The new cross-modal alignment loss becomes:

$$\mathcal{L}_{cm} = \lambda_1 (z_f - z_t)^2 + \lambda_2 \left(1 - \frac{z_f \cdot z_t}{\|z_f\| \, \|z_t\|}\right)$$

The mapping network F tries to project vectors into the same latent space as the latent avatar parameter vector encoder 610, designated as $E_t$, a network that has been previously pretrained as described, so as to learn rich representations of the inputs. The goal of this loss is to impose a strong regularization over the weights of F, using the weights of $E_t$ as guidance. To address the difference in network shape between $E_t$ and F, this loss is enforced in the last layer F, which shares the same dimensionality. Intuitively, the $E_t$ is treated as the teacher network, and since the last layer of F is tasked to project a hidden vector into the same latent space as $E_t$ projects, F imitates as close as possible to $E_t$. The weight alignment loss is as follows:

$$\mathcal{L}_{ur} = \|\theta_f - \theta_t\|_2^2$$

where $\theta_f$ and $\theta_t$ represent the weights of the last layer of F and $E_t$. The final loss is then:

$$\mathcal{L} = \lambda_r \mathcal{L}_{rec} + \lambda_c \mathcal{L}_{cm} + \lambda_{ur} \mathcal{L}_{ur}$$

Said differently, the total loss during the training of this stage is the reconstruction loss (e.g., MSE) between avatar parameter value input 628 and decoded avatar parameter value 630+$\mathcal{L}_{cm}$ (cross modal alignment loss, which is the cosine similarity between cross-modal mapping model output vector 618 and latent avatar parameter vector 622 in FIG. 6)+$\mathcal{L}_{w}$ (weight alignment loss, which is the MSE, for example, between the weights of the last layer of F (cross-modal mapping model 602) and $E_t$ (latent avatar parameter vector encoder 610) as noted in the above equations.

Figure 7:
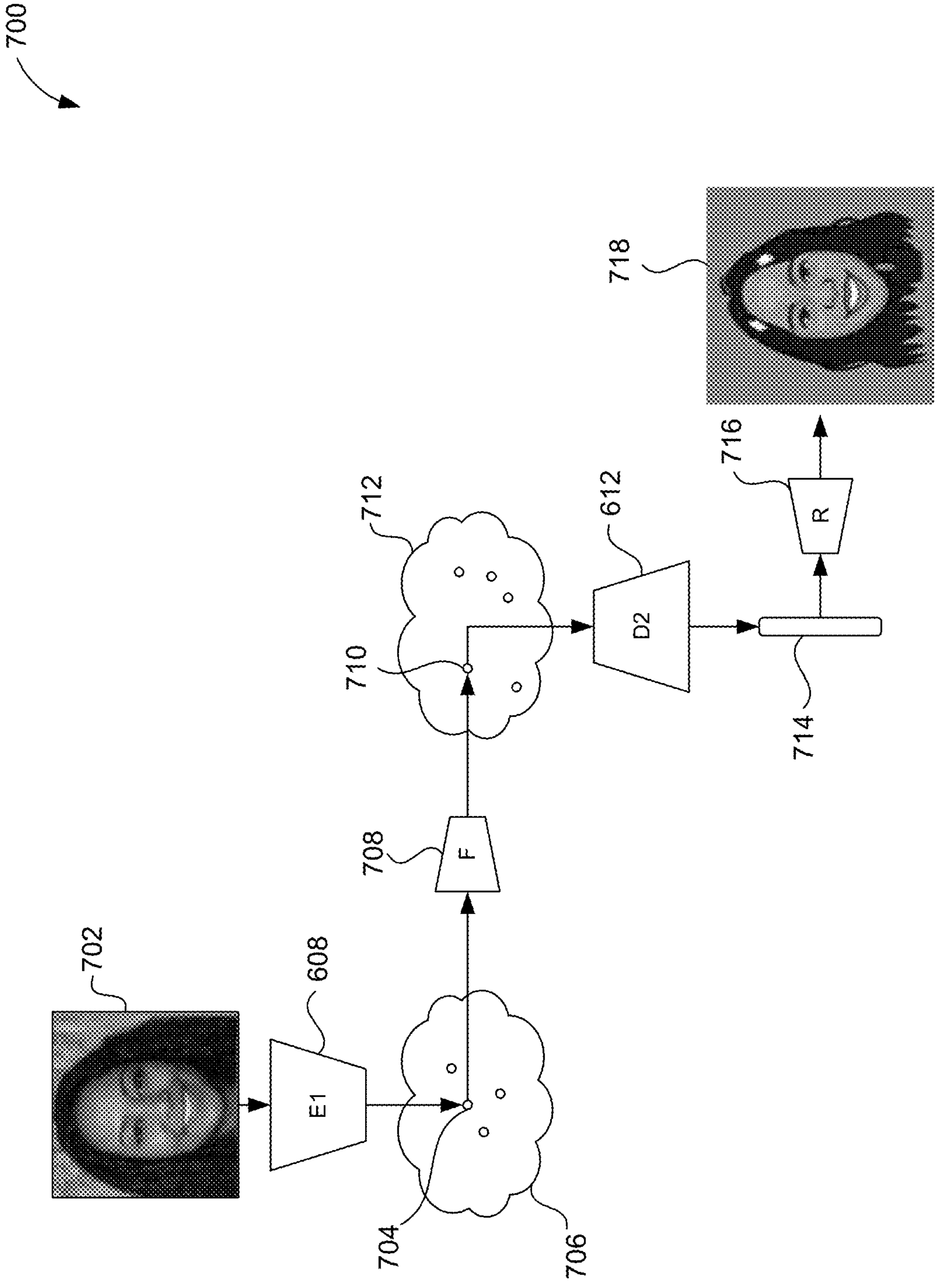
FIG. 7 illustrates an example model and process for generating an avatar using the trained models of FIGS. 5 and 6, in accordance with an embodiment described herein.

Referring now to FIG. 7, the figure illustrates an example process for generating an avatar using the trained models, such as trained image space model 126, trained avatar parameter space model 128, and trained cross-modal mapping model 130, having been trained as previously described with respect to FIGS. 5-6. The model illustrated may be employed as avatar generator 112 of FIG. 1 to generate avatars from image inputs, as shown in FIG. 7.

FIG. 7 illustrates inference process 700, which uses the trained models to receive image input 702, and from it, generates avatar 718. To generate avatar 718, the model illustrated using inference process 700 uses latent image vector encoder 608 and latent avatar parameter vector decoder 612, having been trained as previously described. Latent image vector encoder 608 and latent avatar parameter vector decoder 612 may respectively be referred to as the trained image space model, e.g., trained image space model 126 and trained avatar parameter space model, e.g., trained avatar parameter space model 128. The model further uses trained cross-modal mapping model 708 which is the trained cross-modal mapping model 602 trained as previously described. Trained cross-modal mapping model 708 is an example of trained cross-modal mapping model 130.

Here, latent image vector encoder 608 receives image input 702 in order to generate an avatar from the image. Based on the training, latent image vector encoder 608 generates latent image vector 704 in latent image vector space 706 from image input 702. Latent image vector 704 is passed through trained cross-modal mapping model 708 to translate it from a vector in latent image vector space 706 to a vector in latent avatar parameter vector 710. Based on its training, trained cross-modal mapping model 708 generates latent avatar parameter vector 710 in latent avatar parameter vector space 712. Latent avatar parameter vector 710 is the vector representation for the avatar parameters that will generate the avatar for the image of image input 702. Latent avatar parameter vector decoder 612 receives, as an input, latent avatar parameter vector 710, and from it generates avatar parameter values 714 based on its training. Avatar parameter values 714 can be used to generate a visual avatar, illustrated here as avatar 718. That is, each value of the avatar parameter values 714 encodes some feature of avatar 718. The features can be rendered into an image using renderer 716 by reproducing the visual features represented by the values of avatar parameter values 714. Thus, the result of inference process 700 using the model illustrated in FIG. 7 is the generation of avatar 718 from image input 702.

Figure 8:
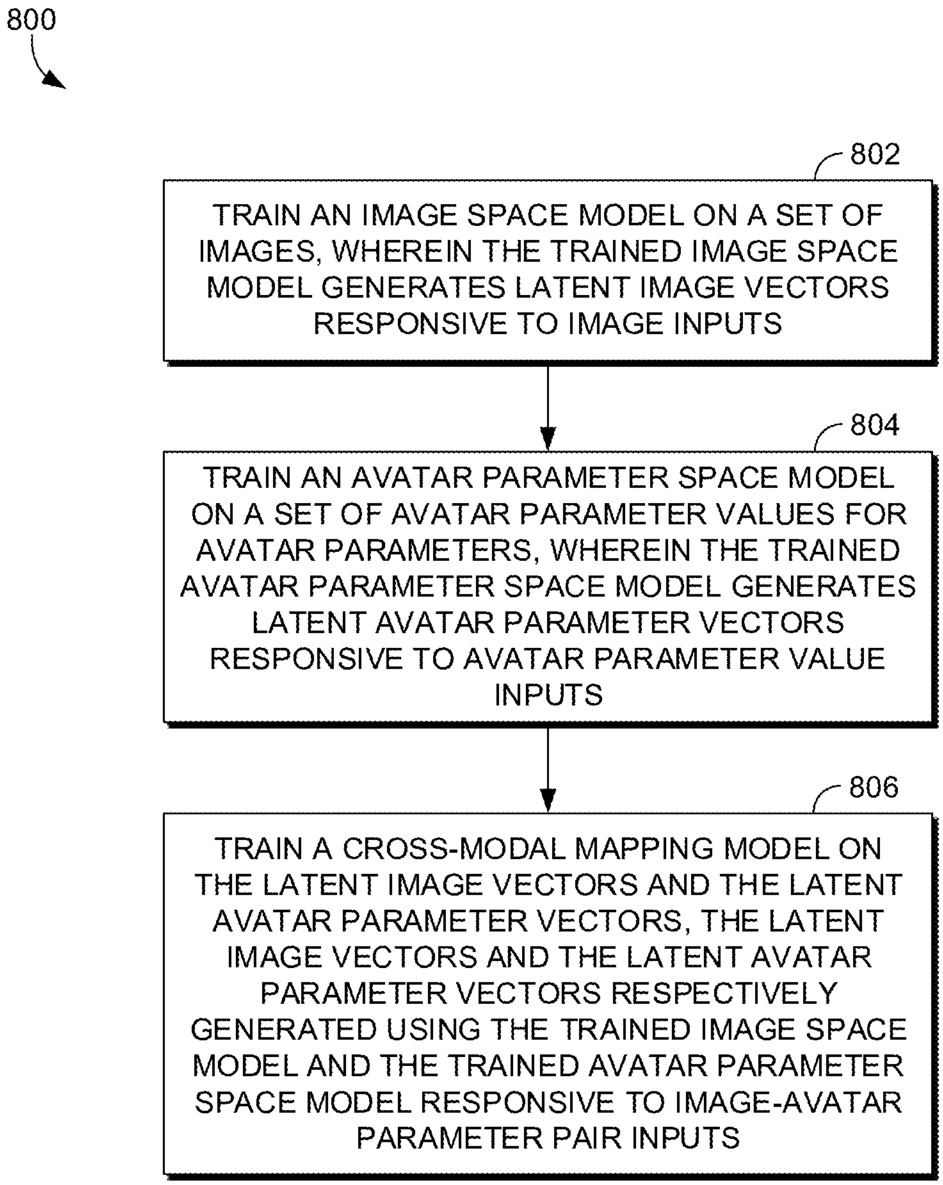
FIG. 8 illustrates an example method of training a model for generating an avatar, in accordance with an embodiment described herein.
Figure 9:
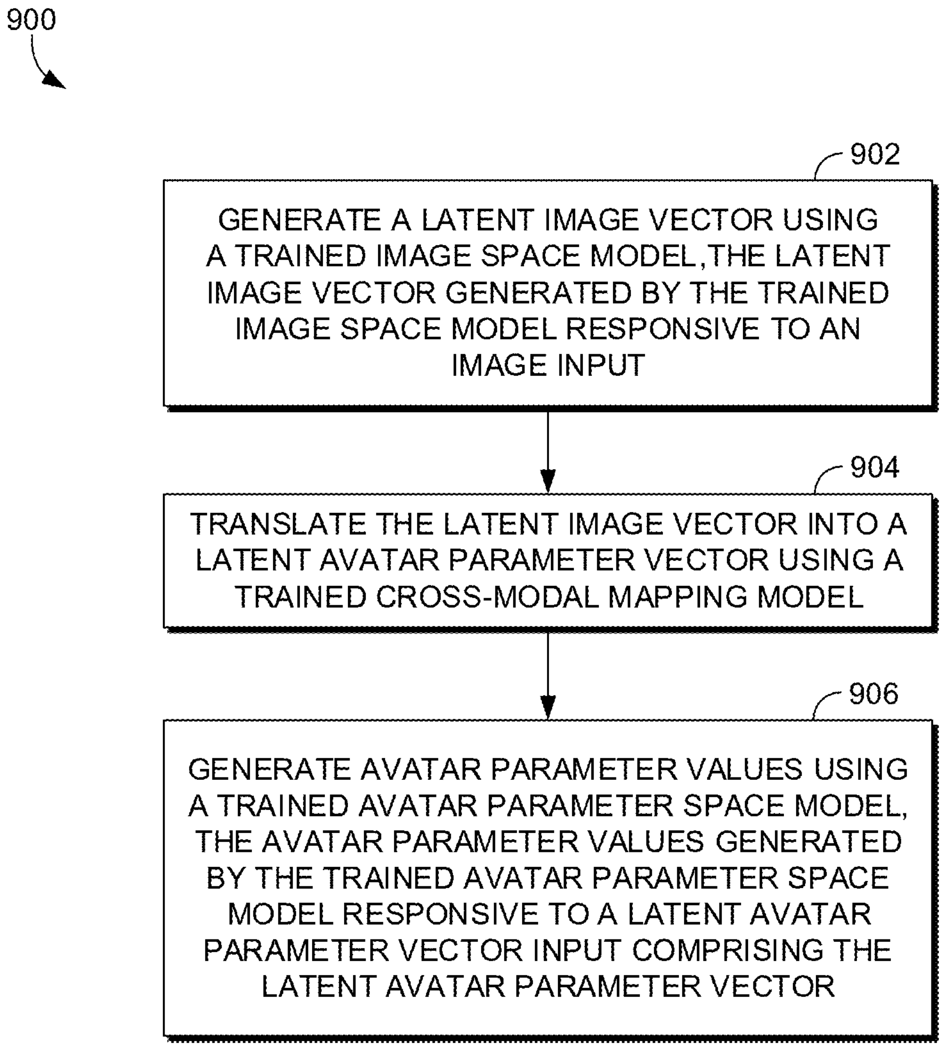
FIG. 9 illustrates an example method of avatar generation using the models trained in FIG. 8, in accordance with an embodiment described herein.

Referring generally to FIGS. 8 and 9, block diagrams are provided respectively illustrating methods 800 and 900, which describe aspects of avatar generation. Each block of methods 800 and 900 may comprise a computing process performed using any combination of hardware, firmware, or software. For instance, various functions can be carried out by a processor executing instructions stored in memory. The methods can also be embodied as computer-usable instructions stored on computer-storage media. The methods can be provided by a standalone application, a service or hosted service (standalone or in combination with another hosted service), or a plug-in to another product, to name a few possibilities. Methods 800 and 900 may be implemented in whole or in part by components of operating environment 100.

Turning specifically now to FIG. 8, at block 802, an image space model is trained. The image space model is an autoencoder in an aspect of the technology. Image space trainer 114 of FIG. 1 may be employed to train the image space model. The encoder of the autoencoder may be saved as a trained image space model following training. During train, the encoder learns to represent an image as a vector within a latent image vector space. In an embodiment, the training is an unsupervised training method. The training may be performed using a dataset of images. The image dataset may comprise any type of image. However, in a specific implementation, the images of the image dataset may comprise a set of faces. As an example, the training may be done using image space training data 120.

At block 804, an avatar parameter space model is trained. The avatar parameter space model may be an autoencoder in an embodiment. The training of the avatar parameter space model may be done independently of training the image space model. That is, the training may be done separately using a training set. During training, a latent avatar parameter vector encoder learns to encode avatar parameters into representative vectors in the latent avatar parameter vector space, while a latent avatar parameter vector decoder learns to decode the vectors in the latent avatar parameter vector space into their respective avatar parameter values. This can be an unsupervised training method. The trained latent avatar parameter vector decoder may be saved as the trained avatar parameter space model. The latent avatar parameter vector encoder may be used in training a cross-modal mapping model, as will be described.

The avatar parameter space model may be trained using avatar parameter space training data, such as avatar parameter space training data 122. This avatar parameter space training data can be generated by modifying a set of avatar parameter values that represent an image. In an aspect, an initial set of avatar parameter values is modified to generate another set of avatar parameter values. These values are then stored as part of avatar parameter space training data.

At block 806, a cross-modal mapping model is trained. The cross-modal mapping model may be trained using image-avatar parameter pairs, such as those described with reference to cross-modal mapping model training data 124. These pairs may be generated by adjusting a set of avatar parameter values to generate an avatar having features corresponding to those of an image. The generated avatar parameter values are then associated with the image and saved as part of the image-avatar parameter pairs on which the cross-modal mapping model is trained. Using the image-avatar parameter pairs, training the cross-modal mapping model may be considered a supervised training method.

When training the cross-modal mapping model, the images of the image-avatar parameter pairs may be input to the latent image vector encoder, which generates latent image vectors in the latent image vector space. The cross-modal mapping model outputs a cross-modal mapping model output vector in the latent avatar parameter vector space from a latent image vector input. The latent avatar parameter vector encoder is used as a teacher network, as it outputs latent avatar parameter vectors in the latent avatar parameter vector space responsive to avatar parameter inputs of the image-avatar parameter pairs. The alignment loss between the cross-modal mapping model output vector outputs and the latent avatar parameter vector outputs is minimized during training, thus teaching the cross-modal mapping model to translate latent image vectors from the latent image vector space to latent avatar parameter vectors in the latent avatar parameter vector space. In an implementation, the trained latent parameter vector decoder is also used to train the cross-modal mapping model. For instance, during training of the cross-modal mapping model, the loss between the input to the latent avatar parameter encoder (the avatar parameters) and the output of the latent avatar parameter vector decoder is minimized in addition to minimizing the alignment loss.

With reference now to FIG. 9, an example method 900 for generating avatar parameters using the models trained in method 800 is provided. In an aspect, method 900 is performed using 112 of FIG. 1. At block 902, a latent image vector within a latent image vector space is generated. The latent image vector may be generated using a trained image space model. The trained image space model comprises latent image vector encoder, such as the encoder trained at block 802. The latent image vector can be generated from an image input to the trained image space model.

At block 904, the latent image vector generated at block 902 is translated from the latent image vector space to a latent avatar parameter vector within a latent avatar parameter vector space. The translation may be done using a cross-modal mapping model. For instance, the trained cross-modal mapping model from block 806 may be employed to translate the latent image vector to the latent avatar parameter vector.

At block 906 avatar parameter values are generated. Avatar parameter values may be generated using an avatar parameter space model. The avatar parameter space model may be a trained avatar parameter space model, such as the one trained at block 804. For instance, the trained avatar parameter space model may comprise a latent avatar parameter vector decoder that receives the latent avatar parameter vector from block 904 as an input and, in response, generates the avatar parameter values. In an aspect, the avatar parameter values generated at block 906 may be rendered into an avatar having features that correspond to the input image at block 902. In an aspect, the image input comprises a face, and the avatar parameter values define an avatar comprising facial features corresponding to the face.

Figure 10:
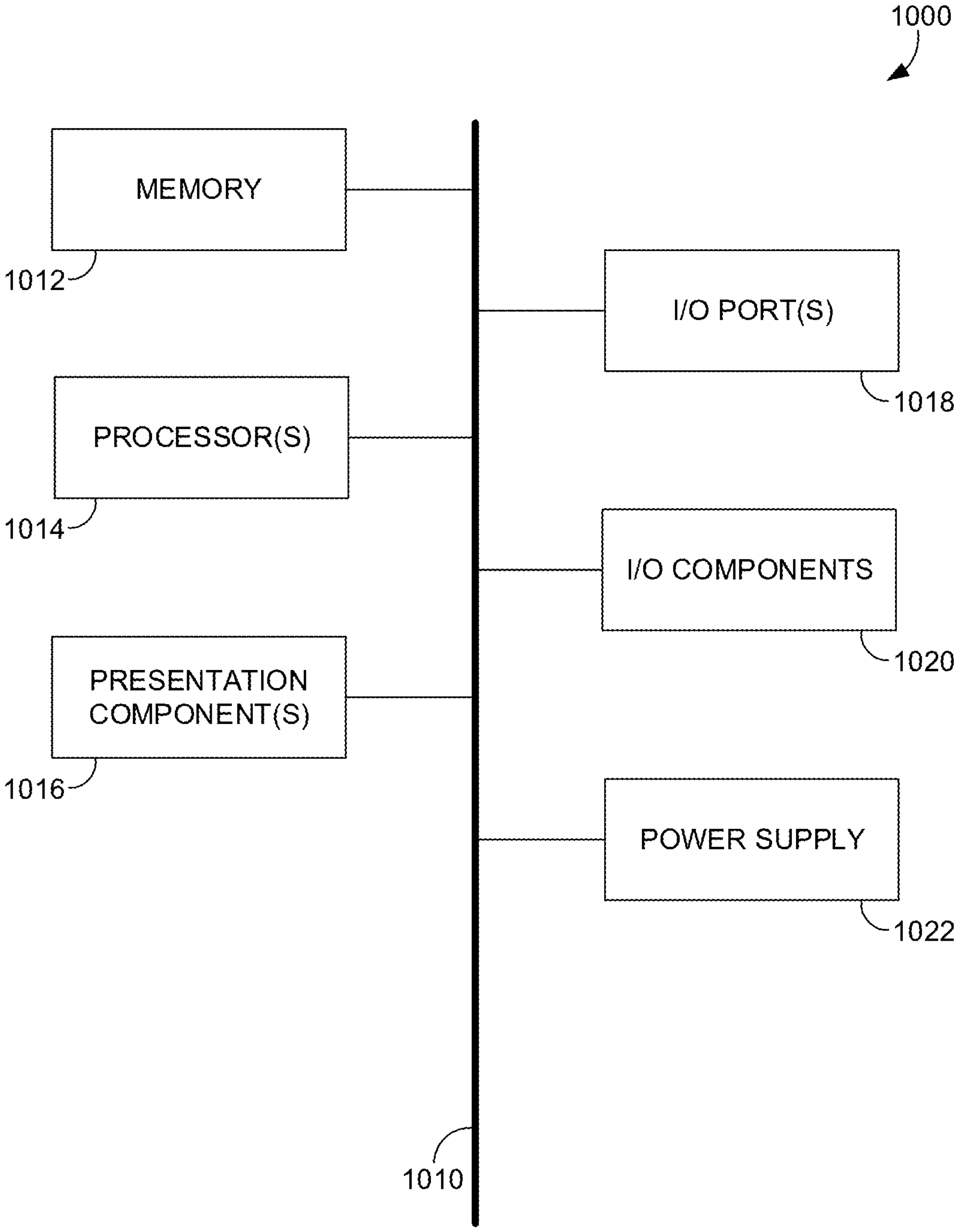
FIG. 10 illustrates an example computing device in which aspects of the technology may be employed.

Having described an overview of some embodiments of the present technology, an example computing environment in which embodiments of the present technology may be implemented is described below in order to provide a general context for various aspects of the present technology. Referring now to FIG. 10 in particular, an example operating environment for implementing embodiments of the present technology is shown and designated generally as computing device 1000. Computing device 1000 is but one example of a suitable computing environment and is not intended to suggest any limitation as to the scope of use or functionality of the technology. Computing device 1000 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 10, computing device 1000 includes bus 1010, which directly or indirectly couples the following devices: memory 1012, one or more processors 1014, one or more presentation components 1016, input/output (I/O) ports 1018, input/output components 1020, and illustrative power supply 1022. Bus 1010 represents what may be one or more buses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 10 is merely illustrative of an example computing device that can be used in connection with one or more embodiments of the present technology. Distinction is not made between such categories as "workstation," "server," "laptop," "hand-held device," etc., as all are contemplated within the scope of FIG. 10 and with reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVD), or other optical disk storage; magnetic cassettes; magnetic tape; magnetic disk storage or other magnetic storage devices; or any other medium which can be used to store the desired information and that can be accessed by computing device 1000. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its features set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1012 includes computer-storage media in the form of volatile or nonvolatile memory. The memory may be removable, non-removable, or a combination thereof. Example hardware devices include solid-state memory, hard drives, optical-disc drives, etc. Computing device 1000 includes one or more processors that read data from various entities, such as memory 1012 or I/O components 1020. Presentation component(s) 1016 presents data indications to a user or other device. Example presentation components include a display device, speaker, printing component, vibrating component, etc.

I/O ports 1018 allow computing device 1000 to be logically coupled to other devices, including I/O components 1020, some of which may be built in. Illustrative components include a microphone, joystick, game pad, satellite dish, scanner, printer, wireless device, etc. The I/O components 1020 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, or gesture recognition, both on screen and adjacent to the screen, as well as air gestures, head and eye tracking, or touch recognition associated with a display of computing device 1000. Computing device 1000 may be equipped with depth cameras, such as stereoscopic camera systems, infrared camera systems, RGB (red-green-blue) camera systems, touchscreen technology, and combinations of these, for gesture detection and recognition. Additionally, the computing device 1000 may be equipped with accelerometers or gyroscopes that enable detection of motion. The output of the accelerometers or gyroscopes may be provided to the display of computing device 1000 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher level software, such as application software; and any combination thereof. In this regard, components for preserving machine learning model can manage resources and provide the described functionality. Any other variations and combinations thereof are contemplated within embodiments of the present technology.

With reference briefly back to FIG. 1, Database 106 generally stores information, including data, computer instructions (e.g., software program instructions, routines, or services), or models used in embodiments of the described technologies. Although depicted as a single database component, database 106 may be embodied as one or more databases or may be in the cloud. In aspects, database 106 is representative of a distributed ledger network.

Network 108 may include one or more networks (e.g., public network or virtual private network (VPN)) as shown with network 108. Network 108 may include, without limitation, one or more local area networks (LANs) wide area networks (WANs), or any other communication network or method.

Generally, server 102 is a computing device that implements functional aspects of operating environment 100, such as one or more functions training engine 110 and avatar generator 112 that facilitate automatic avatar generation. One suitable example of a computing device that can be employed as server 102 is described as computing device 1000 with respect to FIG. 10. In implementations, server 102 represents a back-end or server-side device.

Computing device 104 is generally a computing device that may be used to provide images for avatar generation, among implementing other functions and aspects. As with other components of FIG. 1, computing device 104 is intended to represent one or more computing devices. One suitable example of a computing device that can be employed as computing device 104 is described as computing device 1000 with respect to FIG. 10. In implementations, computing device 104 is a client-side or front-end device. In addition to server 102, computing device 104 may implement functional aspects of operating environment 100, such as one or more functions of training engine 110 or avatar generator 112. It will be understood that some implementations of the technology will comprise either a client-side or front-end computing device, a back-end or server-side computing device, or both executing any combination of functions from training engine 110 and avatar generator 112, among other functions. In an aspect, computing device 104 comprises a mobile device having a camera for capturing images that can be provided for automatic avatar generation. In an example aspect, the camera is positioned on the mobile device on a front aspect that also includes a display that displays, in real time, images being captured by the camera. In this example, the camera may be used by a person to take a self-portrait of their face.

With reference still to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1, such as those described in relation to training engine 110 and avatar generator 112, are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory, such as database 106. Moreover, functions of training engine 110 and avatar generator 112, among other functions, may be performed by server 102, computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

Throughout this disclosure, some aspects of the technology are specifically described using facial images. One aspect of the technology generates avatars using images of faces. However, it will be understood that the technology may be used with other types of images and in other contexts.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or hardware-based buses, receivers, or transmitters using communication media described herein.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

As used herein, an "avatar parameters" or a "set of avatar parameters" includes "avatar parameter values." As such, in some cases, these words may be used interchangeably.

For purposes of a detailed discussion above, embodiments of the present technology are described with reference to a distributed computing environment. However the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

Some example aspects that can be practices from the forgoing description include the following:

Aspect 1: A method for avatar generation performed by one or more processors, the method comprising: training an image space model on a set of images, wherein the trained image space model generates latent image vectors responsive to image inputs; training an avatar parameter space model on a set of avatar parameter values for avatar parameters, wherein the trained avatar parameter space model generates latent avatar parameter vectors responsive to avatar parameter value inputs; and training a cross-modal mapping model on the latent image vectors and the latent avatar parameter vectors, the latent image vectors and the latent avatar parameter vectors respectively generated using the trained image space model and the trained avatar parameter space model responsive to image-avatar parameter pair inputs.

Aspect 2: Aspect 1, further comprising generating the set of avatar parameter values by modifying an initial set of avatar parameter values for an avatar.

Aspect 3: Any of Aspects 1-2, further comprising generating the image-avatar parameter pair inputs by receiving modifications to avatar parameter values such that avatars generated as a result of the modifications correspond to images, wherein the modified avatar parameter values and corresponding images form image-avatar parameter pairs used as the image-avatar parameter pair inputs.

Aspect 4: Any of Aspects 1-3, wherein the avatar parameter space model is trained independently from the image space model.

Aspect 5: Any of Aspects 1-4, wherein training the cross-modal mapping model comprises minimizing an alignment loss between cross-modal mapping model output vectors and the latent avatar parameter vectors.

Aspect 6: Any of Aspects 1-5, wherein the trained cross-modal mapping model is configured to translate a latent image vector from a latent image vector space to a latent avatar parameter vector of a latent avatar parameter vector space.

Aspect 7: any of Aspects 1-6 wherein: the image space model is trained using unsupervised learning; the avatar parameter space model is trained using unsupervised learning; or the cross-modal mapping model is trained using supervised learning.

Aspect 8: Any of Aspects 1-7, wherein: the image space model comprises a convolutional neural network; the avatar parameter space model comprises a first multilayer perceptron; or the cross-modal mapping model comprises a second multilayer perceptron.

Aspect 9: Any of Aspects 1-8, wherein: the trained image space model comprises a latent image vector encoder of a latent image vector autoencoder; and the trained avatar parameter space model comprises a latent avatar parameter vector decoder of a latent avatar parameter vector autoencoder.

Aspect 10: One or more computer storage media storing computer readable instructions thereon that, when executed by a processor, cause the processor to perform a method for avatar generation, the method comprising: accessing latent image vectors generated from image inputs using a trained image space model; accessing latent avatar parameter vectors generated from avatar parameter value inputs using a trained avatar parameter space model, wherein the image inputs and the avatar parameter value inputs form image-avatar parameter pairs; and training a cross-modal mapping model on the latent image vectors and the latent avatar parameter vectors.

Aspect 11: Aspects 10, wherein training the cross-modal mapping model comprises minimizing an alignment loss between cross-modal mapping model output vectors and the latent avatar parameter vectors.

Aspect 12: Any of Aspects 10-11, wherein the trained cross-modal mapping model is configured to translate a latent image vector from a latent image vector space to a latent avatar parameter vector of a latent avatar parameter vector space.

Aspect 13: Any of Aspects 10-12, wherein the cross-modal mapping model is trained using supervised learning.

Aspect 14: Any of Aspects 10-13, wherein the cross-modal mapping model comprises a multilayer perceptron.

Aspect 15: A system for avatar generation, the system comprising: at least one processor; and one or more computer storage media storing computer readable instructions thereon that when executed by the at least one processor cause the at least one processor to perform operations comprising: generating a latent image vector using a trained image space model, the latent image vector generated by the trained image space model responsive to an image input; translating the latent image vector into a latent avatar parameter vector using a trained cross-modal mapping model; and generating avatar parameter values using a trained avatar parameter space model, the avatar parameter values generated by the trained avatar parameter space model responsive to a latent avatar parameter vector input comprising the latent avatar parameter vector.

Aspect 16: Aspect 15, further comprising rendering an avatar from the avatar parameter values.

Aspect 17: Any of Aspects 15-16, wherein: the trained image space model comprises a latent image vector encoder of a latent image vector autoencoder; and the trained avatar parameter space model comprises a latent avatar parameter vector decoder of a latent avatar parameter vector autoencoder.

Aspect 18: Any of Aspects 15-17, wherein: the trained image space model is configured to generate the latent image vector based on unsupervised training from a set of images; the trained cross-modal mapping model is configured to translate the latent image vector based on supervised training from image-avatar parameter pairs; and the trained avatar parameter space model is configured to generate the avatar parameter values based on unsupervised training from a set of avatar parameter values for avatar parameters.

Aspect 19: Any of Aspects 15-18, wherein: the trained image space model comprises a convolutional neural network; the trained avatar parameter space model comprises a first multilayer perceptron; and the trained cross-modal mapping model comprises a second multilayer perceptron.

Aspect 20: Any of Aspects 15-19, wherein the image input comprises a face, and the avatar parameter values define an avatar comprising facial features corresponding to the face.

What is claimed is:

1. A method for avatar generation performed by one or more processors, the method comprising:

training an image space model on a set of images, wherein the trained image space model generates latent image vectors responsive to image inputs;

training an avatar parameter space model on a set of avatar parameter values for avatar parameters, wherein the trained avatar parameter space model generates latent avatar parameter vectors responsive to avatar parameter value inputs; and training a cross-modal mapping model on the latent image vectors and the latent avatar parameter vectors, the latent image vectors and the latent avatar parameter vectors respectively generated using the trained image space model and the trained avatar parameter space model responsive to image-avatar parameter pair inputs.

2. The method of claim 1, further comprising generating the set of avatar parameter values by modifying an initial set of avatar parameter values for an avatar.

3. The method of claim 1, further comprising generating the image-avatar parameter pair inputs by receiving modifications to avatar parameter values such that avatars generated as a result of the modifications correspond to images, wherein the modified avatar parameter values and corresponding images form image-avatar parameter pairs used as the image-avatar parameter pair inputs.

4. The method of claim 1, wherein the avatar parameter space model is trained independently from the image space model.

5. The method of claim 1, wherein training the cross-modal mapping model comprises minimizing an alignment loss between cross-modal mapping model output vectors and the latent avatar parameter vectors.

6. The method of claim 1, wherein the trained cross-modal mapping model is configured to translate a latent image vector from a latent image vector space to a latent avatar parameter vector of a latent avatar parameter vector space.

7. The method of claim 1, wherein:

the image space model is trained using unsupervised learning;

the avatar parameter space model is trained using unsupervised learning; and the cross-modal mapping model is trained using supervised learning.

8. The method of claim 1, wherein:

the image space model comprises a convolutional neural network;

the avatar parameter space model comprises a first multilayer perceptron; and the cross-modal mapping model comprises a second multilayer perceptron.

9. The method of claim 1, wherein:

the trained image space model comprises a latent image vector encoder; and the trained avatar parameter space model comprises a latent avatar parameter vector decoder.

10. One or more computer storage media storing computer readable instructions thereon that, when executed by a processor, cause the processor to perform a method for avatar generation, the method comprising:

accessing latent image vectors generated from image inputs using a trained image space model;

accessing latent avatar parameter vectors generated from avatar parameter value inputs using a trained avatar parameter space model, wherein the image inputs and the avatar parameter value inputs from image-avatar parameter pairs; and training a cross-modal mapping model on the latent image vectors and the latent avatar parameter vectors.

11. The media of claim 10, wherein training the cross-modal mapping model comprises minimizing an alignment loss between cross-modal mapping model output vectors and the latent avatar parameter vectors.

12. The media of claim 10, wherein the trained cross-modal mapping model is configured to translate a latent image vector from a latent image vector space to a latent avatar parameter vector of a latent avatar parameter vector space.

13. The media of claim 10, wherein the cross-modal mapping model is trained using supervised learning.

14. The media of claim 10, wherein the cross-modal mapping model comprises a multilayer perceptron.

15. A system for avatar generation, the system comprising:

at least one processor; and one or more computer storage media storing computer readable instructions thereon that when executed by the at least one processor cause the at least one processor to perform operations comprising:

generating a latent image vector using a trained image space model, the latent image vector generated by the trained image space model responsive to an image input;

translating the latent image vector into a latent avatar parameter vector using a trained cross-modal mapping model; and generating avatar parameter values using a trained avatar parameter space model, the avatar parameter values generated by the trained avatar parameter space model responsive to a latent avatar parameter vector input comprising the latent avatar parameter vector.

16. The system of claim 15, further comprising rendering an avatar from the avatar parameter values.

17. The system of claim 15, wherein:

the trained image space model comprises a latent image vector encoder; and the trained avatar parameter space model comprises a latent avatar parameter vector decoder.

18. The system of claim 15, wherein:

the trained image space model is configured to generate the latent image vector based on unsupervised training from a set of images;

the trained cross-modal mapping model is configured to translate the latent image vector based on supervised training from image-avatar parameter pairs; and the trained avatar parameter space model is configured to generate the avatar parameter values based on unsupervised training from a set of avatar parameter values for avatar parameters.

19. The system of claim 15, wherein:

the trained image space model comprises a convolutional neural network;

the trained avatar parameter space model comprises a first multilayer perceptron; and the trained cross-modal mapping model comprises a second multilayer perceptron.

20. The system of claim 15, wherein the image input comprises a face, and the avatar parameter values define an avatar comprising facial features corresponding to the face.

* * * * *